US010982984B2

(12) United States Patent
Radhakrishnan et al.

(10) Patent No.: US 10,982,984 B2
(45) Date of Patent: Apr. 20, 2021

(54) TECHNIQUE TO MEASURE THE DISTANCE BETWEEN STATIONS USING DGPS/RTK GPS IN THE VELOCITY AREA METHOD (STATIONARY) WITH AN ACOUSTIC DOPPLER CURRENT PROFILER

(71) Applicant: YSI, INC., Yellow Springs, OH (US)

(72) Inventors: Muthiah Radhakrishnan, San Diego, CA (US); Martin Milanov, San Diego, CA (US); Daniel J. Wagenaar, San Diego, CA (US); Issac Jones, San Diego, CA (US)

(73) Assignee: YSI, INC., Yellow Springs, OH (US)

( * ) Notice: Subject to any disclaimer, the term of this patent is extended or adjusted under 35 U.S.C. 154(b) by 523 days.

(21) Appl. No.: 15/795,455

(22) Filed: Oct. 27, 2017

(65) Prior Publication Data
US 2018/0156647 A1 Jun. 7, 2018

Related U.S. Application Data

(60) Provisional application No. 62/413,503, filed on Oct. 27, 2016.

(51) Int. Cl.
*G01F 1/00* (2006.01)
*G01S 19/13* (2010.01)
(Continued)

(52) U.S. Cl.
CPC .............. *G01F 1/002* (2013.01); *G01C 13/00* (2013.01); *G01D 1/00* (2013.01); *G01F 1/663* (2013.01);
(Continued)

(58) Field of Classification Search
CPC ......... G01F 1/002; G01F 1/663; G01C 13/00; G01S 15/50; G01S 15/80; G01S 19/13
See application file for complete search history.

(56) References Cited

U.S. PATENT DOCUMENTS 5,780,747 A 7/1998 Soo
6,453,256 B1* 9/2002 Gordon ................ G01C 13/006
702/100
(Continued)

FOREIGN PATENT DOCUMENTS

CN 201133828 Y 10/2008
CN 101339200 B 12/2010
(Continued)

OTHER PUBLICATIONS

Muste et al. "Practical aspects of ADCP data use for quantification of mean river flow characteristics; Part II: fixed vessel measurements", Flow Measurement and Instrumentation vol. 15, Issue 1, Mar. 2004, pp. 17-28, website printed out on Jan. 2, 2018. http://www.sciencedirect.com/science/article/pii/S0955598603000682.
(Continued)

*Primary Examiner* — Alexander Satanovsky
*Assistant Examiner* — Douglas Kay
(74) *Attorney, Agent, or Firm* — Ware, Fressola, Maguire & Barber LLP

(57) ABSTRACT

A system for determining a measurement of a discharge of a streamflow in open channel conditions using a velocity-area technique featuring a signal processor configured to receive ADCP measurement signaling containing information about ADCP measurements taken in conjunction with the streamflow, GPS signaling containing information about GPS readings in conjunction with ADCP measurements, and signaling containing information about a projection or virtual tag line using two (2) Global Position System (GPS) locations having start and end latitudes and longitudes at a measurement site in a hydrographic operation for a measurement of a discharge in open channel conditions, and an instantaneous GPS position for a station; and determine control signaling containing information to take the ADCP
(Continued)

measurements and the GPS readings in conjunction with the ADCP measurements, as well as corresponding signaling containing information about the measurement of the discharge of the streamflow, based upon a respective distance between each station in relation to the projection or virtual tag line, as well as ADCP signaling and the GPS signaling received, using Differential Global Position System (DGPS) or Real Time Kinematic GPS (RTK GPS).

16 Claims, 8 Drawing Sheets

(51) Int. Cl.
| | |
|---|---|
| G01F 1/66 | (2006.01) |
| G01C 13/00 | (2006.01) |
| G01S 15/50 | (2006.01) |
| G01S 15/88 | (2006.01) |
| G05D 1/00 | (2006.01) |
| H04W 88/00 | (2009.01) |
| G01D 1/00 | (2006.01) |
| G05D 1/02 | (2020.01) |

(52) U.S. Cl.
CPC .............. *G01S 15/50* (2013.01); *G01S 15/88* (2013.01); *G01S 19/13* (2013.01); *G05D 1/00* (2013.01); *H04W 88/00* (2013.01); *G01C 13/006* (2013.01); *G05D 1/02* (2013.01)

(56) References Cited

U.S. PATENT DOCUMENTS

| 7,523,658 | B1 | 4/2009 | Polonichko et al. |
| 8,068,789 | B2 | 11/2011 | Bell et al. |
| 8,125,849 | B2 | 2/2012 | Cabrera et al. |
| 2003/0076742 | A1 | 4/2003 | Rowe |
| 2005/0131645 | A1* | 6/2005 | Panopoulos .......... B60P 1/5457 |
| | | | 701/472 |
| 2010/0154561 | A1 | 6/2010 | Cabrera et al. |
| 2011/0075518 | A1 | 3/2011 | Huhta et al. |
| 2013/0345994 | A1 | 12/2013 | Wiklund et al. |
| 2017/0277815 | A1* | 9/2017 | Lorang ................... G01S 15/58 |

FOREIGN PATENT DOCUMENTS

| CN | 101470190 | B1 | 11/2011 |
| CN | 102200436 | B | 5/2013 |
| CN | 102564508 | B | 12/2013 |
| CN | 102735871 | B | 12/2013 |
| CN | 104865581 | A | 8/2015 |
| CN | 105158505 | A | 12/2015 |
| GB | 2376740 | A | 12/2002 |
| JP | 1048321 | A | 2/1998 |
| JP | 2011149720 | A | 8/2011 |
| JP | 5213212 | B2 | 6/2013 |
| KR | 20020053518 | A | 7/2002 |
| KR | 100687634 | B1 | 3/2007 |
| KR | 100982554 | B1 | 9/2010 |
| KR | 101544147 | B1 | 8/2015 |

OTHER PUBLICATIONS

Gonzalez-Castro et al. "Comparison of Discharge Estimates from ADCP Transect Data with Estimates from Fixed ADCP Mean Velocity Data", Hydraulic Measurements and Experimental Methods Specialty Conference (HMEMJ) 2002, website printed out on Jan. 7, 2018. https://ascelibrary.org/doi/pdf/10.1061/40655%282002%2915.

"Quality-Assurance Plan for Discharge Measurements Using Acoustic Doppler Currents Profilers," USGS, pubs.usgs.gov, Oct. 9, 2006. http://web.archive.org/web/20061009033558/http://pubs.usgs.gov/sir/2005/5183/index_toch.html.

Yang, Sung-Kee, et al. "Development of Topological Correction Algorithms for ADCP Multibeam Bathymetry Measurements," EGU General Assembly Conference Abstracts, vol. 15, 2013. http://adsabs.harvard.edu/abs/2013EGUGA..15.2431Y.

Xiao, B., et al., "River cross-section surveying using RTK Technology: the Yangtze River project case study," Coordinates Monthly Mag Positioning Navig Beyond 2.12, 2006, pp. 12-17. http://mycoordinates.org/river-cross-section-surveying-using-rtk-technology/all/1/.

"Positioning Systems: Trimble Introduces Marine GPS Receiver with Two-Centimeter Vertical Accuracy," IDR—International Dredging Review, dredgemag.com, Sep.-Oct. 2007. http://www.dredgemag.com/Sep.-Oct.-2007/Positioning-Systems-Trimble-Introduces-Marine-GPS-Receiver-with-Two-Centimeter-Vertical-Accuracy/.

CN101339200B with English language translation and Abstract.
English language translation and Abstract of CN101470190A.
English language translation and Abstract of CN102200436A.
English language translation and abstract of CN102564508.
English language translation and abstract of CN102735871.
English language translation and abstract of CN104865581A.
English language translation and abstract of CN105158505.
English language translation and abstract of CN201133828.
English language translation and abstract of JP5213212.
English language translation and abstract of JP2011149720.
English language translation and abstract of JPH1048321A.
English language translation and abstract of KR100687634B1.
English language translation and abstract of KR100982554B1.
English language translation and abstract of KR101544147B1.
KR20020053518A English language Abstract.

* cited by examiner

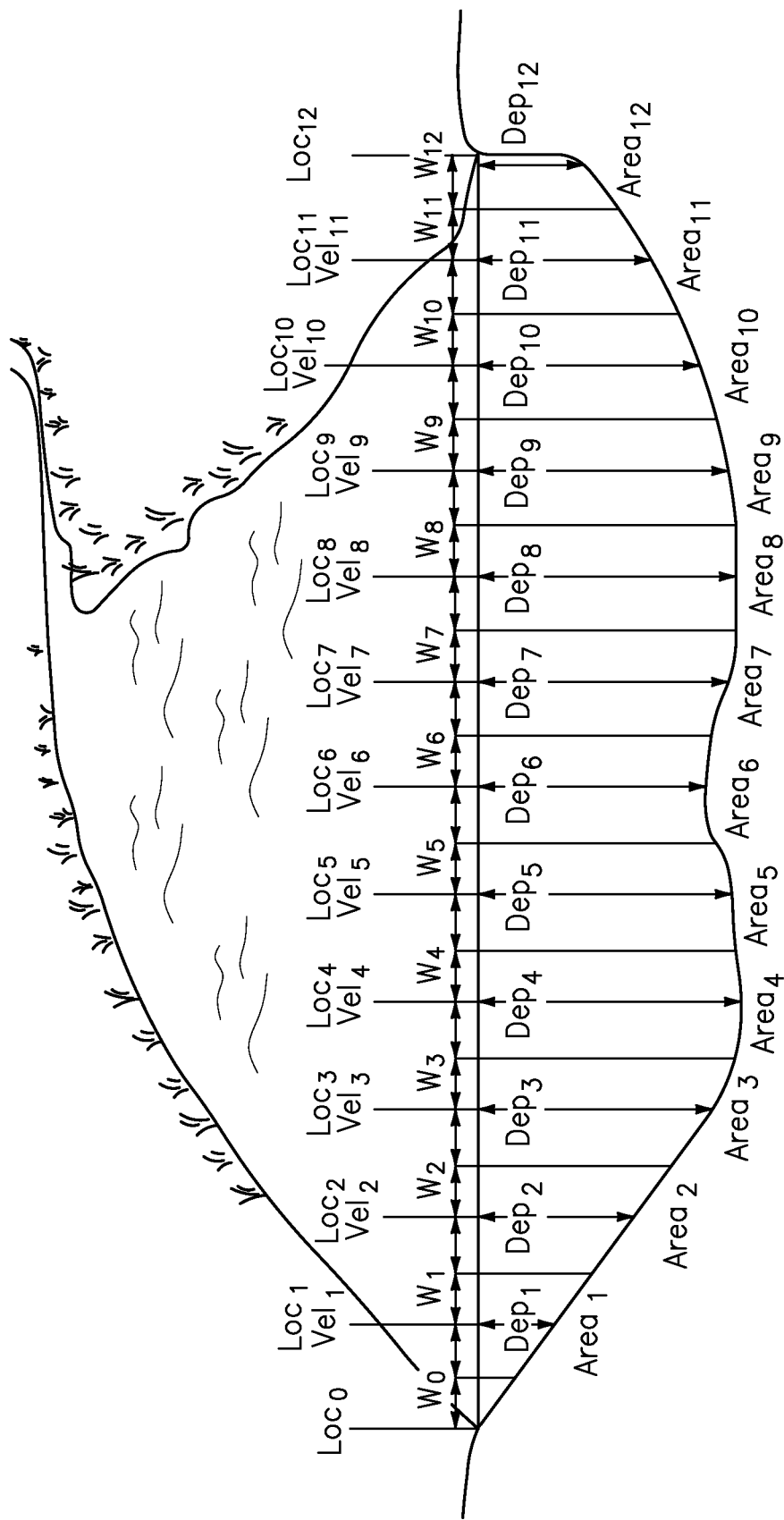
*FIG. 1A*: Mid-Section Velocity Area Method
(PRIOR ART)

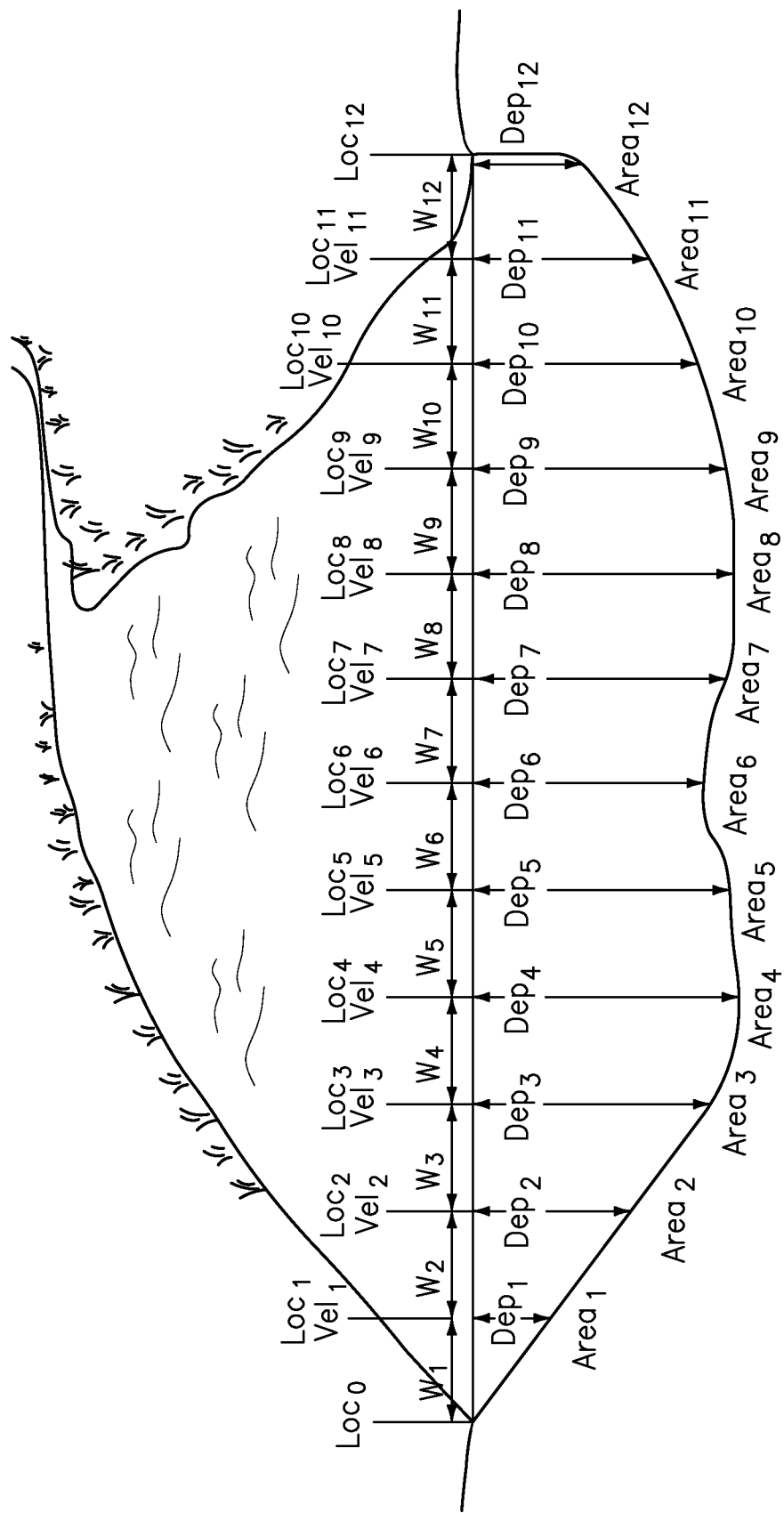
FIG. 1B: Mean-Section Velocity Area Method
(PRIOR ART)

FIG. 2A: Wading Velocity Area Method
(PRIOR ART)
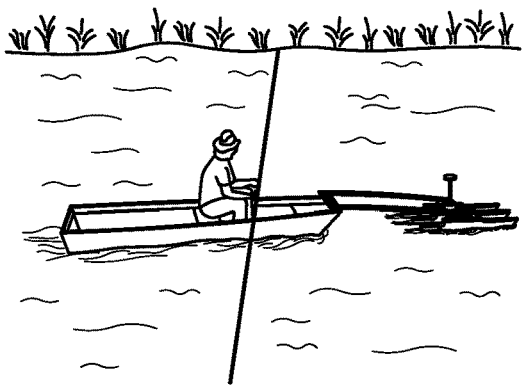
FIG. 2B: Boat Velocity Area Method
(PRIOR ART)
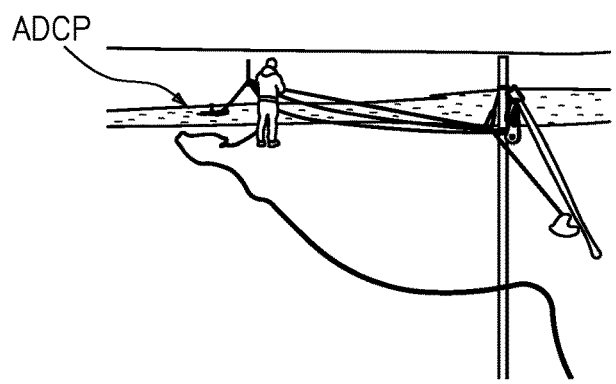
FIG. 2C: Cable Way Velocity Area Method
(PRIOR ART)

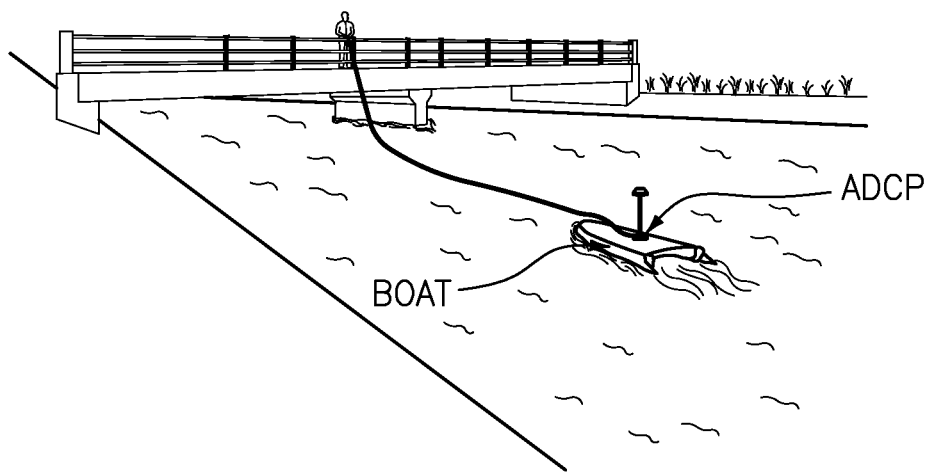
FIG. 2D: Bridge Velocity Area Method
(PRIOR ART)
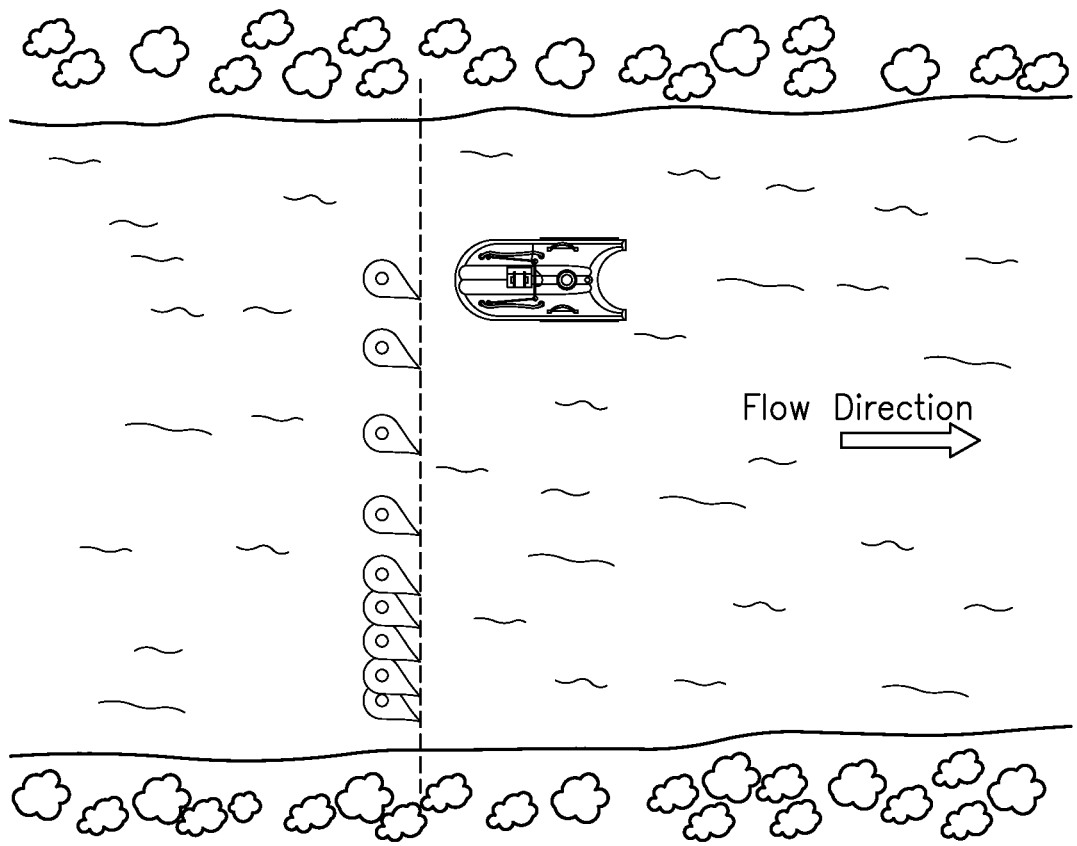
FIG. 3A: Boat Velocity Area Method
(PRIOR ART)

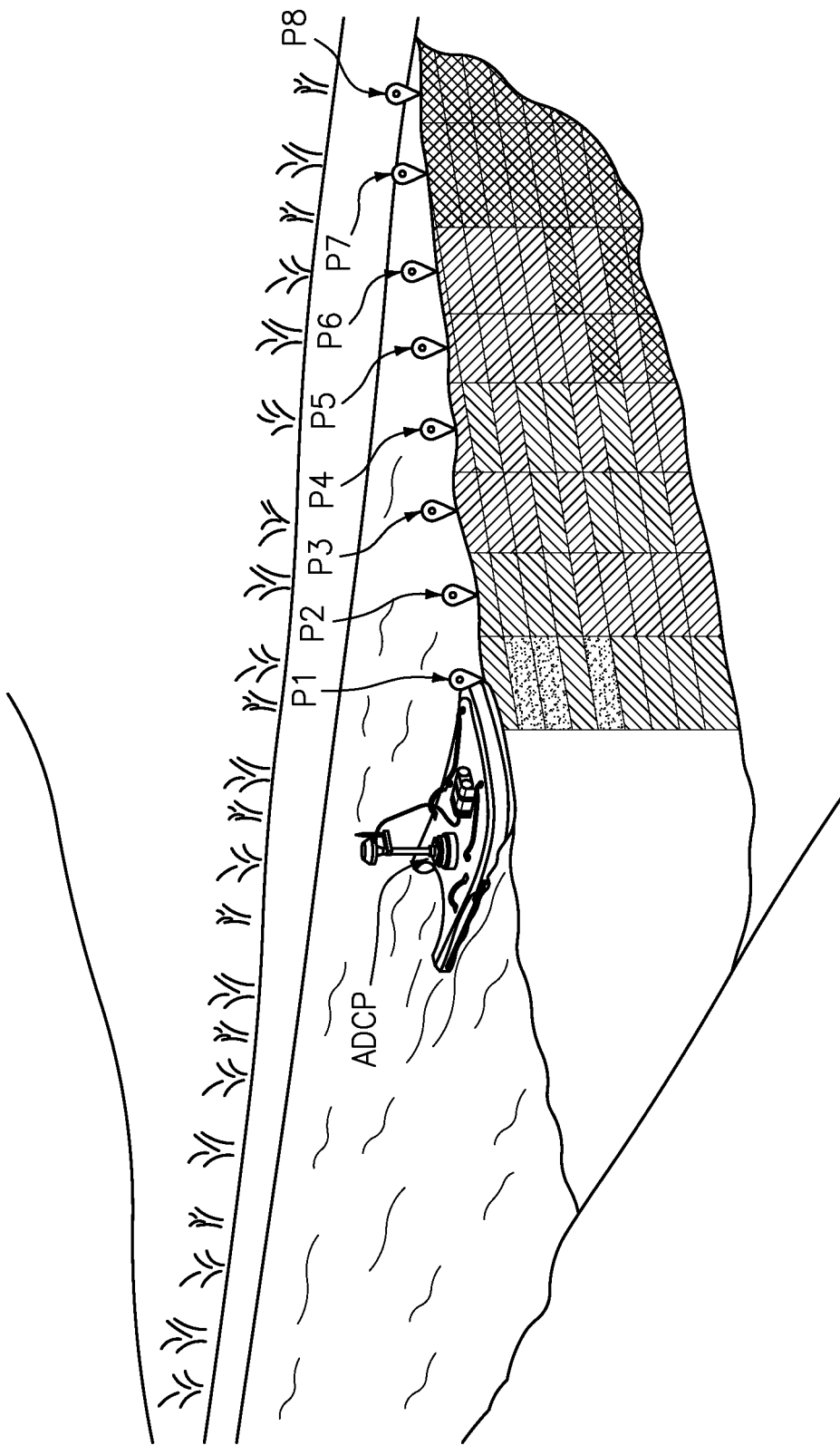
*FIG. 3B*: Boat Velocity Area Method (PRIOR ART)

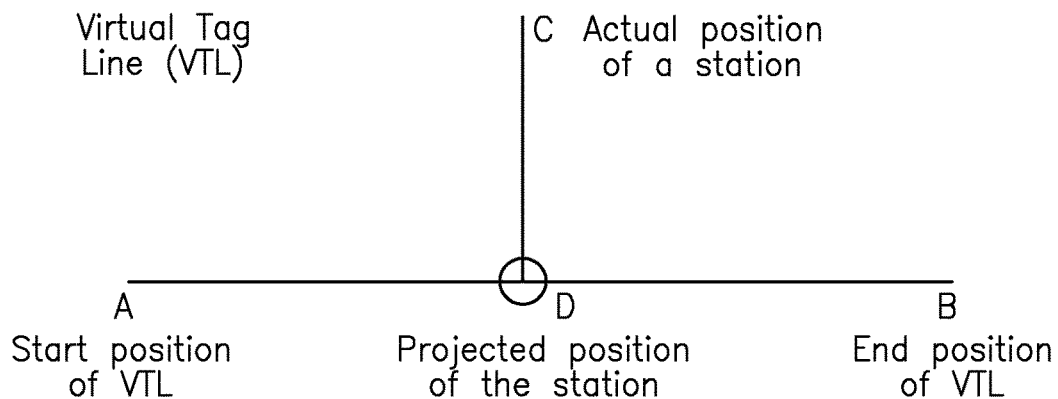
FIG. 4: The Virtual Tag Line
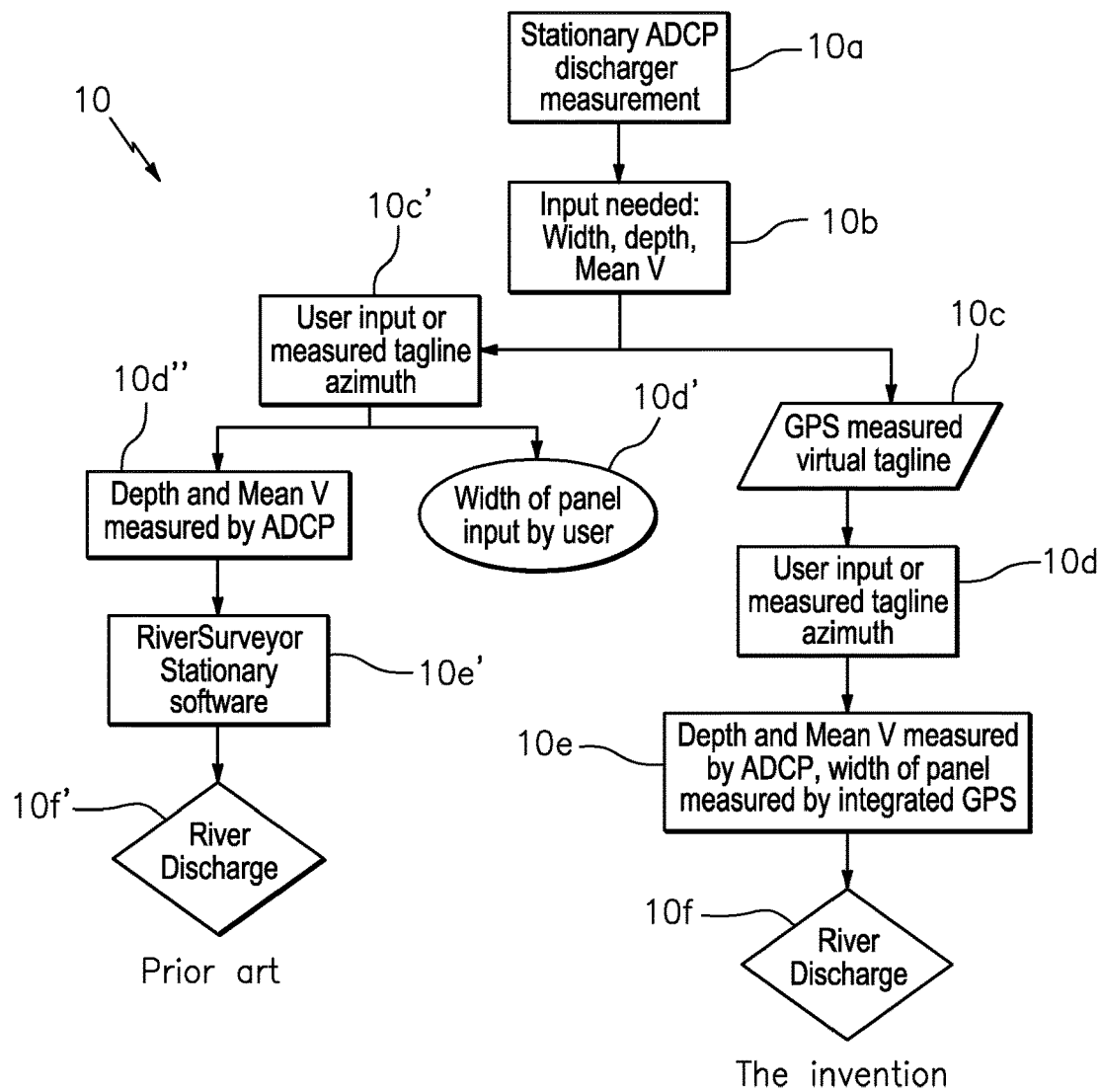
FIG. 5: The Flow Chart

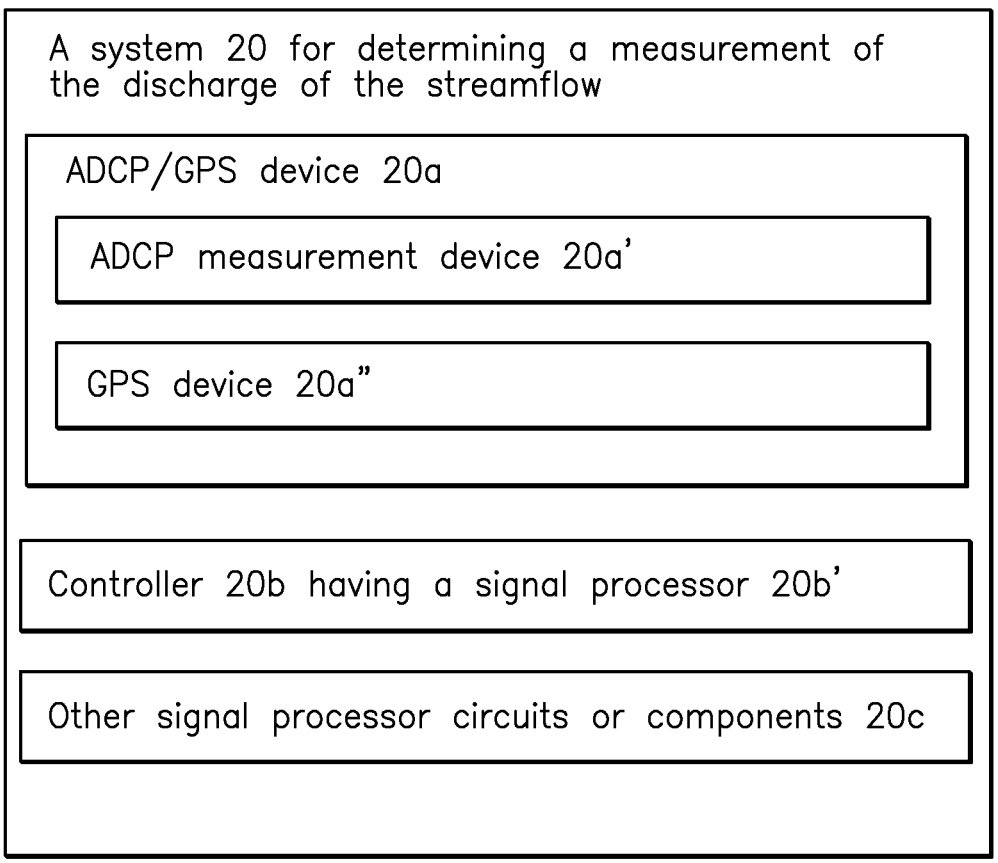
FIG. 6A: System 20 and Associated Signal Processing Functionality

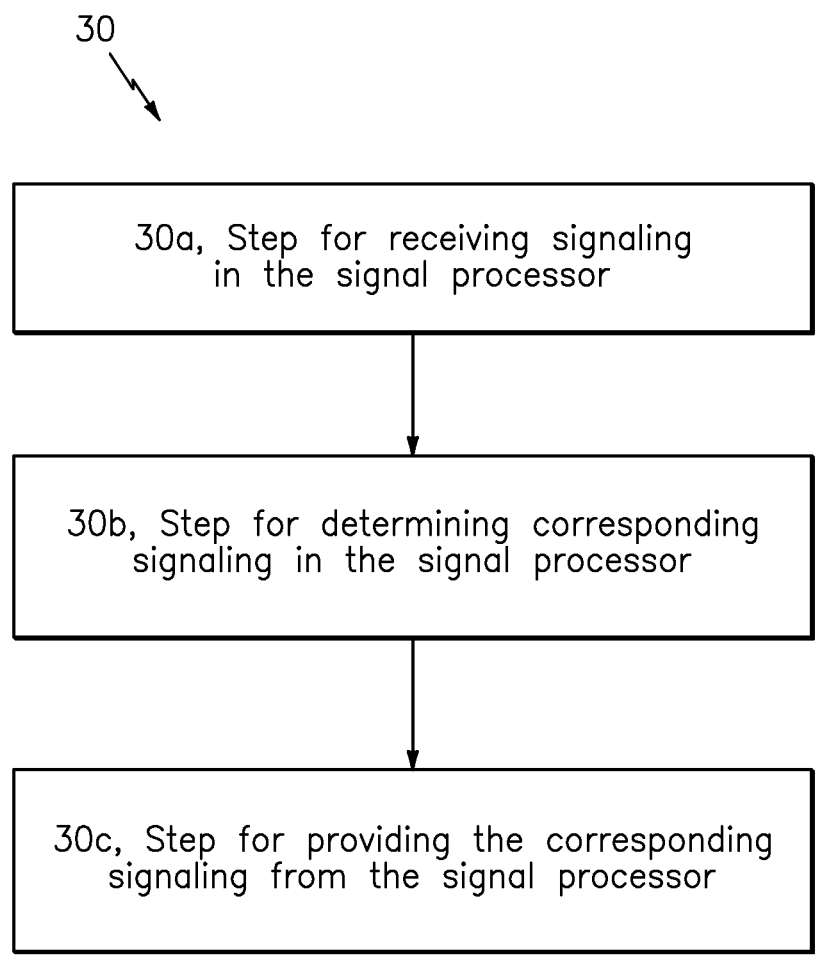
FIG. 6B: The Basic Method

TECHNIQUE TO MEASURE THE DISTANCE BETWEEN STATIONS USING DGPS/RTK GPS IN THE VELOCITY AREA METHOD (STATIONARY) WITH AN ACOUSTIC DOPPLER CURRENT PROFILER

CROSS-REFERENCE TO RELATED APPLICATIONS

This application claims benefit to provisional patent application Ser. No. 62/413,503 (911-023.5-1/N-YSI-0035US), filed 27 Oct. 2016, which is incorporated by reference in its entirety.

BACKGROUND OF THE INVENTION

1. Field of Invention

This invention relates to a system for measuring the discharge of a river or stream; and more particularly relates to a system for measuring distance between stations in a velocity area method that is used to measure the discharge of a river or streamflow.

2. Description of Related Art

The Velocity Area Method is used in hydrographic operations for the measurement of discharge in open channel conditions. The application of the Velocity Area method is suitable for a wide range of instruments such a mechanical current meters, electromagnetic instruments, Acoustic Doppler Velocimeters (ADV) and Acoustic Doppler Current Meters (ADCP). There are two recognized calculation methods for calculating discharge using the velocity area method, e.g., Mid-Section method (FIG. 1A) and the Mean-Section method (FIG. 1B), which show locations ($LOC_0$, $LOC_1$, ..., $LOC_{12}$), widths ($W_0$, $W_1$, ..., $W_{12}$), depths ($Dep_1$, $Dep_2$, ..., $Dep_{12}$), and areas ($Area_1$, $Area_2$, ..., $Area_{12}$) and velocities ($Vel_1$, $Vel_2$, ..., $Vel_{11}$) spanning the river.

Traditionally, the distance between stations for the Velocity-Area method is either determined using a tape measure or incremental tagline. In this approach, an assumption is made that the actual location of measurement is where the user reads the distance using tape measure. The actual measurement location may be affected by velocity angle towards the instrument or other environmental conditions such as wind direction. This approach has a few drawbacks such as, the limitation of site selection (e.g., the site needs a walkway/bridge) and inaccuracy in the ADCP data collection because of boat movement.

In particular, in the Mid-Section method (FIG. 1A), one assume that the average velocity to be applied to the incremental area or panel is equal to the average velocity in the vertical. The position of the panels used in the calculation is such that they are "straddling" the verticals. Therefore the panel width is calculated as equal to the next chainage minus the previous chainage divided by two.

In the Mean-Section method (FIG. 1B), the incremental areas used in the calculation are chosen differently and therefore the method of calculation differs from the Mid-section. Here the panels are positioned between the verticals and not straddling them. Because of this it is necessary to calculate an average depth and an average velocity for each panel.

The Mid-Section and Mean-Section calculation methods are well documented in ISO 748-2007, Hydrometry—Measurement of liquid flow in open channels using current meters or floats and WMO-No. 1044, Volume I—Fieldwork, 2010. The Velocity Area Method consists of creating a number of stations or verticals across a measurement section of a channel. The number of stations or verticals required at a measurement section is defined in the ISO 748-2007 with 23 stations as the most common requirement. The measurement procedure consists of the following process to collect the required variables for calculating discharge using either the Mid-Section or Mean-Section.

- Determine the number of stations or verticals required for discharge measurement across measurement section,
- Measure the distance between each station or vertical. The distance can be determined using either tape measure or increment tagline.
- Measure the water depth at each station or vertical.
- Measure water velocity at each station or vertical. The number of point velocity measurements at a station is dependent on the water depth The Velocity Area Method can be performed from a number of operating platforms using each of the instruments types listed above. The four main operating platforms are Wading, Boat, Cable Way and Bridge measurements.

Consistent with that shown in FIG. 2A, wading measurements require a hydrographer to enter the channel to perform measurements required at each station or vertical. The wading method is normally used for low to medium flows.

Consistent with that shown in FIG. 2B, boat measurements are normally performed in large rivers or during medium to high flow events. Boat measurements can also consist of Hydroboards or remote control boats. See also FIGS. 3A and 3B.

Consistent with that shown in FIG. 2C, cable way measurements are normally performed at existing cable way systems. This type of platform is suitable for most flow conditions.

Consistent with that shown in FIG. 2D, bridges are an ideal measurement platform because they spans the entire measurement section and give the hydrographer access without implementing major infrastructure or deployment requirements.

The measurement platforms described above require the same variables for calculating discharge. The method and complexity in measuring the station or vertical position differs considerably between the platforms. The more complex the measurements of the station or vertical position the higher the uncertainty of the accuracy of the measurement. Currently, the use of tape measure or increment tagline is the only method of determining the station or vertical location.

In view of this, there is a need in the art for adopting another way to measure distance between stations, e.g., instead of a tape measure or an incremental tagline is not needed, that overcomes the aforementioned limitations in the prior art techniques.

SUMMARY OF THE INVENTION

According to some embodiments, the present invention may include, or take the form of, a system for determining a measurement of a discharge of a streamflow or river in open channel conditions using a velocity-area technique, e.g., featuring a controller having a signal processor configured to:

receive ADCP measurement signaling containing information about ADCP measurements taken in conjunction with the streamflow or river, GPS signaling taken in conjunction with the ADCP measurements, as well as signaling containing information about a projection or virtual tag line using two (2) Global Position System (GPS) locations having start and end latitudes and longitudes at a measurement site in a hydrographic operation for a measurement of a discharge in open channel conditions, and an instantaneous GPS position for a station; and determine control signaling containing information to take the ADCP measurements and the GPS reading in conjunction with the ADCP measurements, as well as corresponding signaling containing information about the measurement of the discharge of the streamflow, based upon a respective distance between each station in relation to the projection or virtual tag line, as well as ADCP signaling and the GPS signaling received, e.g., using Differential Global Position System (DGPS) or Real Time Kinematic GPS (RTK GPS).

The system may include one or more of the following additional features:

The signal processor may be configured to provide corresponding signaling containing information about the measurement of the discharge of the streamflow.

The signal processor may be configured to measure the depth and mean velocity using an Acoustic Doppler Current Profiler (ADCP) and a respective width of each station by using an integrated GPS approach.

The signal processor may be configured to convert the start and end latitudes and longitudes into start and end Universal Transverse Mercator (UTM) Eastings and Northings to use for determining actual and projected UTM Easting and Northing positions in order to determine the respective distance between each station in relation to the projection or virtual tag line.

The system may include an ADCP measurement device configured to receive the control signaling, take the ADCP measurements and provide ADCP measurement containing information about the ADCP measurements, and provide the ADCP measurement signaling.

The system may include a GPS device configured to configured to receive the control signaling, take the GPS readings and provide the GPS reading signaling containing information about the GPS readings.

The ADCP/GPS device may be configured with the ADCP measurement device in combination with the GPS device, e.g., as a combined device.

The Method

According to some embodiments, the present invention may include a method featuring steps for receiving in a signal processor or processing module ADCP measurement signaling containing information about ADCP measurements taken in conjunction with the streamflow or river, GPS signaling taken in conjunction with the ADCP measurements, as well as signaling containing information about a projection or virtual tag line using two (2) Global Position System (GPS) locations having start and end latitudes and longitudes at a measurement site in a hydrographic operation for a measurement of a discharge in open channel conditions, and an instantaneous GPS position for a station; and determining in the signal processor or processing module control signaling containing information to take the ADCP measurements and the GPS reading in conjunction with the ADCP measurements, as well as corresponding signaling containing information about the measurement of the discharge of the streamflow, based upon a respective distance between each station in relation to the projection or virtual tag line, as well as ADCP signaling and the GPS signaling received, e.g., using Differential Global Position System (DGPS) or Real Time Kinematic GPS (RTK GPS).

The method may also include one or more of the features set forth above.

Computer-Readable Storage Medium

According to some embodiments of the present invention, the present invention may also take the form of a computer-readable storage medium having computer-executable components for performing the steps of the aforementioned method. The computer-readable storage medium may also include one or more of the features set forth above.

Advantages

One advantage of the present invention is that it addresses the aforementioned limitations in the prior art techniques by adopting another way to measure distance between stations, e.g., where a tape measure or an incremental tagline is not needed.

Another advantage of the present invention is that it enables a more accurate data measurement, e.g., for high CFM river flow, as well as for low CFM river flow.

Another advantage of the present invention is that it provides a more expedient stationary measurement technique, e.g., particularly in cases where a prior art tagline (see FIG. 2C) may not be laid down. In effect, the present invention eliminates the need for laying down a stationary tagline, and allows the use of a virtual tagline instead. The present invention also allows for river discharge measurements at sites that were previously not capable of being measured in a practical sense using the stationary prior art technique.

Another advantage of the present invention is that it can be used instead of the prior art moving boat measurement technique, which has been used for higher level applications where greater accuracy may be required or desired. In effect, the present invention allows an engineer to use of a stationary measurement technique according to the present invention, which has comparable accuracy to the prior art moving boat technique.

BRIEF DESCRIPTION OF THE DRAWING

The drawing, which are not necessarily drawn to scale, includes FIGS. 1-6B, as follows:

FIG. 1A shows an illustration of a Mid-Section velocity area method for determining the discharge of a river that is known in the art.

FIG. 1B shows an illustration of a Mean-Section velocity area method for determining the discharge of a river that is known in the art.

FIG. 2A shows an illustration of a wading velocity area method for determining the discharge of a river that is known in the art.

FIG. 2B shows an illustration of a boat velocity area method for determining the discharge of a river that is known in the art.

FIG. 2C shows an illustration of a cable way velocity area method for determining the discharge of a river that is known in the art.

FIG. 2D shows an illustration of a bridge velocity area method for determining the discharge of a river that is known in the art.

FIG. 3A shows a further illustration of a boat velocity area method for determining the discharge of a river that is known in the art, e.g., with an arrow showing the discharge flow of the river.

FIG. 3B shows a further illustration of a boat velocity area method for determining the discharge of a river that is known in the art, e.g., with a cross-section of the river showing 8 panels delineated.

FIG. 4 is a diagram of a projection or virtual tagline for implementing a way to measure distance between stations, e.g., using a Differential Global Position System (DGPS) or a Real Time Kinematic GPS (RTK GPS), according to some embodiments of the present invention.

FIG. 5 is a combined flowchart showing the prior art method to measure the river discharge in relation to the method of the present invention to measure the river discharge using a GPS measured virtual tagline in conjunction with the mean-sec6tion velocity area technique, according to some embodiments of the present invention.

FIG. 6A shows a block diagram of a system having an ADCP/GPS device and a controller having a signal processor, according to some embodiments of the present invention.

FIG. 6B shows a flowchart of a method having steps for implementing some embodiments of the present invention.

To reduce clutter in the drawing, each Figure in the drawing does not necessarily include every reference label for every element shown therein.

DETAILED DESCRIPTION OF BEST MODE OF THE INVENTION

FIGS. 4 and 5

In summary, the present invention provides the ability to measure distance between stations (aka herein as "panels") using DGPS/RTK GPS in stationary software routines that resolves the above mentioned limitations. With the help of this GPS functionality, a user does not need a tape measure to make an ADCP stationary measurement and will collect accurate location of each station. According to the present invention, the user provides a projection line, e.g., using 2 GPS locations at the measurement site, to project each station locations to that line (which is known herein as a virtual tag line), e.g., based upon implementing the algorithm having the equations described in relation to FIG. 4 and the steps in the flowchart shown in FIG. 5 below.

The Algorithm Having Equations/Steps to Calculate Distance Between Stations Using GPS By way of example, a controller like element 20b (FIG. 6A) having a signal processor like element 20b' (FIG. 6A) may be configured to implement one or more software routines to receive and process suitable data input signaling, e.g., that includes equation/steps to calculate the distance between stations using GPS, as follows:

1: Get Start and End GPS Positions of the projection or virtual tag line:
 a. Start Latitude;
 b. Start Longitude;
 c. End Latitude; and
 d. End Longitude.

2: Get an instantaneous GPS position for a given Station.

3: Average the GPS position over the averaging interval (Latitude and Longitude).

4: Calculate/determine a projected GPS position for a Station, e.g., as follows:
 a. Convert Start Latitude and Start Longitude to Start UTM Easting and Start UTM Northing;
 b. Convert End Latitude and End Longitude to End UTM Easting and Start UTM Northing; and
 c. Convert Latitude and Longitude to UTM Easting and UTM Northing, e.g., based upon that shown in FIG. 4.
 d. FIG. 4 shows a virtual tagline having the following:
  A is a Start Position, e.g., where x1=Start UTM Easting, and y1=Start UTM Northing;
  B is an End Position, e.g., where x2=End UTM Easting, and y2=End UTM Northing;
  C is an Actual Position, e.g., where x3=UTM Easting, and y3=UTM Northing; and
  D is a Projected Position, e.g., where x4=Projected UTM Easting, and y4=Projected UTM Northing.
 e. In conjunction with that shown in FIG. 4, equations to calculate x4 and y4 may include the following:

$$px=x2-x1,$$

$$py=y2-y1,$$

$$dAB=px^2+py^2,$$

$$u=((x3-x1)*px+(y3-y1)*py)/dAB,$$

Projected UTM Easting=$x4=x1+u*px$, and

Projected UTM Northing=$y4=y1+u*py$.

f. Convert the Projected UTM Easting and the Projected UTM Northing to a Projected Latitude and a Projected Longitude.

5: Calculate the distance between stations using GPS coordinates, as follows:
 a. Convert the current station projected GPS Latitude and Longitude to UTM coordinates (e.g., let's say, x1=This Station UTM Easting and y1=This Station UTM Northing);
 b. Convert the previous station projected GPS Latitude and Longitude to UTM coordinates (e.g., let's say, x2=Last Station UTM Easting and y2=Last Station UTM Northing); and
 c. Determine distance, e.g. using: Distance=sqrt((x1−x2)^2+(y1−y2)^2).

6: Insert a station as follows:
 a. Find the bearing between the start position and the end position of the GPS projection line;
 b. Find the bearing between the current station projected GPS position and the previous station projected GPS position; and
 c. If the difference in bearing between GPS projection line and stations is 180 degrees, then the station may be inserted, e.g., by implementing a software routine.

FIG. 5: The Flowchart 10

FIG. 5 is a flowchart generally indicated as 10 having steps 10a thru 10f for implementing the technique according to at least some embodiments of the present invention, while steps 10a thru 10f' for implementing the prior art technique.

In effect, based upon the stations determined, the steps in the flowchart 10 may be implemented in order to determine the river discharge, e.g., using the signal processor like 20b' shown in FIG. 6A. The steps 10a thru 10f and 10a thru 10f' are briefly summarized as follows:

In Step 10a, the signal processor like element 20b' may be configured to implement one or more software routines related to taking, obtaining and processing the stationary ADCP discharge measurement. By way of example, the signal processor like element 20b' may be configured to send control signaling to an ADCP measurement device like 20a' (FIG. 6A), e.g., consistent with that set forth herein. (See also the ADCP measurement that are known in the art, and shown in FIGS. 2A, 2B, 2C and/or 2D.) The signal processor like element 20b' may also be configured to receive suitable ADCP measurement signaling back from the ADCP measurement device containing suitable stationary ADCP discharge measurement.

In Step 10b the signal processor like element 20b' may be configured to implement one or more software routines related to receiving input signaling needed, e.g., in relation to parameters related to the width (W), the depth (D) and the mean velocity (V). By way of example, the signal processor like element 20b' may be configured to receive the suitable input signaling needed, and store suitable signaling about the inputs needed, e.g. for further processing, e.g., when determining the river discharge. According to the present invention, the input signaling may include, e.g., user-defined criteria related to these parameters.

In Step 10c, the signal processor 20b' may be configured to implement one or more routines related to the GPS measured tagline. By way of example, the signal processor like element 20b' may be configured to receive suitable input data signaling containing information about the GPS signaling, e.g., provided by a suitable GPS device or instrument like element 20a'' (FIG. 6A) that may be operated by the user or controlled by a controller like element 20a''', and determine suitable signaling to define the GPS measured tagline.

In Step 10d, the signal processor 20b' may be configured to implement one or more routines related to the user input or measured tagline azimuth. By way of example, the signal processor like element 20b' may be configured to receive and process suitable input data signaling containing information about the user input or measured tagline azimuth, and store suitable corresponding signaling about the user input or measured tagline azimuth for further processing, e.g., when determining the river discharge. As one skilled in the art would appreciate, in step 10d the azimuth may be used, or factored into, in the velocity measurement to take into account streamflow not moving perpendicular to the virtual tagline.

In Step 10e, the signal processor like element 20b' may be configured to implement one or more routines related to the depth and the Mean velocity (V) measured by the ADCP/GPS device 20a, and the width of station/panel measured by an integrated GPS approach, e.g., consistent with that set forth herein. By way of example, the signal processor like element 20b' may be configured to receive and process suitable input data signaling containing information about the depth and Mean velocity (V) measured by the ADCP/GPS device 20a, and the width of panel measured by the integrated GPS approach, and store corresponding suitable signaling about the same for further processing, e.g., when determining the river discharge.

In Step 10f, the signal processor 20b' may be configured to implement one or more routines related to the river discharge determination. By way of example, the signal processor 20b' may be configured to receive and process suitable input data signaling received, processed and/or stored, and determine the river discharge, e.g., for each station, based upon the same, then further process and combine (e.g., adding) the river discharge for each station into the measurement of the discharge of the streamflow. As one skilled in the art would appreciate, the respective river discharge for each station may be determine by multiplying the respective station discharge velocity of each station times the area of each station, where the area is defined by the measured depth times the width of each station. According to some embodiments, the respective station discharge velocity of each station may include, or take the form of, the respective mean velocity (V), when multiple velocity readings are taken and processed.

In contrast, in the prior art technique, after the signal processor implements steps 10a and 10b, it implements one or more routines related to:

step 10c', related to the user input or measured tagline azimuth (Compare step 10d);

steps 10d', 10d'', related to either the depth and Mean V measured by the ADCP (compare step 10e) or the width of panel input by the user;

step 10e', related to implementing the river surveyor stationary software, e.g., consistent with the prior art set forth in the background of the invention section above; and step 10f', related to the river discharge determination (Compare 10f).

FIG. 6A: The ADCP/GPS Device 20a

By way of example, and consistent with that set forth herein, the present invention may include, or take the form of, a system 20 for determining a measurement of the discharge of the streamflow. By way of example, the system 20 may include an ADCP/GPS device 20a, a controller 20b and other signal processor circuits or components 20c.

The ADCP/GPS device 20a may include an ADCP measurement device 20a' configured to receive control signaling, take ADCP measurements in conjunction with the streamflow or river to determine the respective depth and velocity associated with each station along a projection or virtual tagline, and provide ADCP measurement signaling containing information about the same.

The ADCP/GPS device 20a may also include a GPS device 20a'' configured to receive the control signaling, take respective GPS readings in conjunction with the ADCP measurements for each station, and provide GPS signaling containing information about the same.

The controller 20b may be configured with a signal processor 20b' for controlling the functionality thereof, e.g., in order to determine and provide control signaling containing information to take the ADCP measurements and the GPS reading in conjunction with the ADCP measurements.

In addition, the controller 20b may include a signal processor 20b' configured at least to receive the ADCP measurement signaling, the GPS signaling, and signaling containing information about a projection or virtual tag line using two (2) Global Position System (GPS) locations having start and end latitudes and longitudes at a measurement site in a hydrographic operation for a measurement of a discharge in open channel conditions, and an instantaneous GPS position for a station. By way of example, the signaling received containing the information about the projection or virtual tag line may be stored in a suitable memory circuit or component and used to determine and control the taking and provisioning of the respective GPS readings in conjunction with the respective ADCP measurements for each station.

Furthermore, the signal processor 20b' may also be configured at least to determine corresponding signaling containing information about the measurement of the discharge of the streamflow, e.g., based upon a respective distance between each station in relation to the projection or virtual tag line, as well as ADCP signaling and the GPS signaling received, using Differential Global Position System (DGPS) or Real Time Kinematic GPS (RTK GPS).

The ADCP Measurement Device 20a' for Taking ADCP Depth Readings

As One Skilled in the Art would Appreciate, the ADCP Measurement Device 20a' may be used to take one or more ADCP depth readings for each station in order to determine the respective depth associated with the virtual tagline. By way of example, for each station the ADCP measurement device 20a' may be configured to take respective ADCP measurements in relation to associated GPS readings as discussed below. As one skilled in the art would appreciate, the signal processor 20b may be configured to store the respective depth and associated GPS readings for each station. By way of further example, ADCP measurement devices like element 20a' are known in the art, and the scope of the invention is not intended to be limited to any particular type or kind thereof that is either now known or later developed in the future.

The GPS Device 20a" for Taking GPS Readings

As one skilled in the art would appreciate, the GPS device like element 20a" may be used to take the GPS readings associated with the ADCP measurements for each station associated with the virtual tagline. By way of example, GPS devices that are known in the art, and the scope of the invention is not intended to be limited to any particular type or kind thereof that is either now known or later developed in the future. As one skilled in the art would also appreciate, such known GPS devices may include, or take the form of, GPS device that include software routines for implementing DGPS/RTK GPS. As one skilled in the art would appreciate, the signal processor 20b may be configured to store the respective depth and associated GPS readings for each station.

River Discharge Calculation

As one skilled in the art would appreciate, once the distance between the stations (aka panel) is known, the ADCP measurements are taken for each station, and the velocity of the streamflow is determined, then the river discharge calculation may be determined using known river discharge calculation techniques. By way of example, and as one skilled in the art would appreciate, the signal processor 20b' may be configured to store the respective width of each station, the respective depth of each station and the respective velocity for each station. The signal processor 20b' may be configured to determine the respective river discharge for each station, e.g., based upon the respective width, the respective depth and the respective velocity for each station. Furthermore, the signal processor 20b' may be configured to determine the river discharge for the streamflow by combining the respective river discharges for each station.

By way of still further example, the signal processor 20b' may also be configured to provide the corresponding signaling containing information about the measurement of the discharge of the streamflow, e.g., for further processing, consistent with that set forth herein. The scope of the invention is not intended to be limited to any particular type, kind or manner of further processing, and may include further processing techniques either now known or later developed in the future.

Implementation of Signal Processing Functionality

By way of example, the functionality of the signal processor or processing module 20a may be implemented using hardware, software, firmware, or a combination thereof. In a typical software implementation, the signal processor 20b' would include one or more microprocessor-based architectures having, e.g., at least one signal processor or microprocessor like element 20b'. One skilled in the art would be able to program with suitable program code such a microcontroller-based, or microprocessor-based, implementation to perform the signal processing functionality disclosed herein without undue experimentation. For example, the signal processor 20b' may be configured, e.g., by one skilled in the art without undue experimentation, to receive the signaling containing information about a projection or virtual tag line using two (2) Global Position System (GPS) locations having start and end latitudes and longitudes at a measurement site in a hydrographic operation for a measurement of a discharge in open channel conditions, and an instantaneous GPS position for a station, consistent with that disclosed herein.

Moreover, the signal processor 20b' may be configured, e.g., by one skilled in the art without undue experimentation, to determine the control signaling and/or the corresponding signaling containing information about the measurement of the discharge of the streamflow, e.g., consistent with that disclosed herein. By way of further example, the present application discloses techniques for determining the corresponding signaling containing information about the measurement of the discharge of the streamflow by determining a respective distance between each station in relation to the projection or virtual tag line using Differential Global Position System (DGPS) or Real Time Kinematic GPS (RTK GPS); however, the scope of the invention is not intended to be limited to any particular type or kind of signal processing implementation and/or technique for making the determination about the measurement of the discharge of the streamflow by determining a respective distance between each station in relation to the projection or virtual tag line using Differential Global Position System (DGPS) or Real Time Kinematic GPS (RTK GPS), based upon the signaling received.

The scope of the invention is not intended to be limited to any particular implementation using technology either now known or later developed in the future. The scope of the invention is intended to include implementing the functionality of the signal processor(s) 20b' as stand-alone processor, signal processor, or signal processor module, as well as separate processor or processor modules, as well as some combination thereof.

By way of example, the system 20 may also include, e.g., other signal processor circuits or components generally indicated 20c, including random access memory or memory module (RAM) and/or read only memory (ROM), input/output devices and control, and data and address buses connecting the same, and/or at least one input processor and at least one output processor, e.g., which would be appreciate by one skilled in the art.

By way of further example, the signal processor 20b' may include, or take the form of, some combination of a signal processor and at least one memory including a computer program code, where the signal processor and at least one memory are configured to cause the system to implement the functionality of the present invention, e.g., to respond to signaling received and to determine the corresponding signaling, based upon the signaling received.

FIG. 6B: The Basic Method 30

According to some embodiments, the present invention may also include a method generally indicated as 30 comprising steps 30a, 30b and 30c, as follows:
a step 30a for receiving in a signal processor or processing module like element 20a signaling containing information about a projection or virtual tag line using two (2) Global Position System (GPS) locations having start and end latitudes and longitudes at a measurement site in a hydrographic operation for a measurement of a discharge in open channel conditions, and an instantaneous GPS position for a station; and
a step 30b for determining in the signal processor or processing module like element 20a corresponding signaling containing information about the measurement of the discharge of the streamflow by determining a respective distance between each station in relation to the projection or virtual tag line using Differential Global Position System (DGPS) or Real Time Kinematic GPS (RTK GPS), based upon the signaling received.

The method may also include one or more of the features set forth above, including a step 30c for providing the corresponding signaling containing information about the measurement of the discharge of the streamflow.

The Number and Width of Stations

By way of examples, and consistent with that set forth herein, each station may be configured with a width of about 5% of the length of the virtual tagline, e.g., totaling about 20 stations. However, the scope of the invention is not intended to be limited to any particular number of stations, any particular width of each station, etc. For example, embodiments are envisioned, and the scope of the invention is intended to include, using more than 20 stations, or less than 20 stations. As one skilled in the art would appreciate, if 25 stations are used, then each stations may be configured with a width of about 4% of the length of the virtual tagline. In contrast, as one skilled in the art would also appreciate, if 10 stations are used, then each stations may be configured with a width at about 10% of the length of the virtual tagline. In operation, a signal processor may be configured to implement suitable signal processing functionality to store in a suitable memory device the number of stations, the respective width of each station, ADCP measurements associated with each station, GPS signaling associated with each station, e.g. for further processing in order to determine the river discharge for each station, as well as the river discharge for the streamflow.

ADCP

As one skilled in the art would appreciate, an ADCP is a hydroacoustic current meter similar to a sonar, e.g., used to measure water current velocities over a depth range using the Doppler effect of sound waves scattered back from particles within water columns. By way of example, according to some embodiments of the present invention, the ADCP measurement device 20a' may include a piezoelectric transducer to transmit sound signals into a column of water in a river or stream and receive scattered sound signals back prom particles with the water column, and have a suitable signal processor to provide an estimate of the distance or depth of the water column based upon the traveling time of the sound signals transmitted and received back.

The GPS Techniques

By way of example, and as one skilled in the art would appreciate GPS techniques are all known in the art, and the scope of the invention is not intended to be limited to any particular type or kind thereof that may be used herein. By way of example, the GPS techniques may include DGPS, e.g., which is an enhancement to the GPS that provides improved location accuracy, e.g., from the 15-meter nominal GPS accuracy to date to about 10 centimeters (cm) in cases of the best implementations. By way of further example, RTK GPS is a technique used to enhance the precision of position data derived from satellite-based positioning systems, e.g., global navigation satellite systems, GNSS), such as GPS, by using measurements of the phase of the signals carrier wave, rather than the information content of the signal, and relying a single reference station or interpolated virtual station to provide real-time corrections, providing up to a centimeter-level accuracy. The scope of the invention is intended to include using such D/RTK GPS that may be now known in the art or later developed in the future.

By way of example, according to some embodiments of the present invention, the system 20 (FIG. 6A) may include GPS receivers for receiving suitable GPS signaling from GPS satellites, as well as the GPS satellites themselves for provisioning suitable GPS-based signaling, etc.

Universal Transverse Mercator (UTM) Eastings and Northings

As one skilled in the art would appreciate, Universal Transverse Mercator (UTM) Eastings and Northings are geographic Cartesian coordinates for a point. Easting refers to eastward-measured distance (or the x-coordinate), while northing refers to the northward-measured distance (or y-coordinate). When using common projects, such as the transverse Mercator projection, these are distances projected on an imaginary surface, e.g., similar to a bent sheet of paper, and are not typically the same as distances measured on the curved surface of the Earth.

The Scope of the Invention

While the invention has been described with reference to an exemplary embodiment, it will be understood by those skilled in the art that various changes may be made and equivalents may be substituted for elements thereof without departing from the scope of the invention. In addition, may modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:
1. A system for determining a measurement of a discharge of a streamflow in open channel conditions using a velocity-area technique comprising:
a signal processor configured to
receive a signal representing a projection or virtual tag line having a plurality of stations projected onto the projection or virtual tag line which lies between two Global Position System (GPS) locations and having start and end latitudes and longitudes at a measure- ment of a discharge of a streamflow in open channel conditions, the projection or virtual tag line having a start GPS position, an end GPS position, a respective actual GPS position of each of the plurality of stations and a respective projected GPS position of each of the plurality of stations, and also receive a second signal representing a depth and mean velocity of each of the plurality of stations in conjunction with the streamflow obtained from Acoustic Doppler Current Profiler (ADCP) measurements; and provide an output signal about the measurement of the discharge of the streamflow, based upon the first signal and the second signal received.

2. A system according to claim 1, wherein the signal processor is configured to provide the output signal as a control signal to take the ADCP measurements at respective GPS positions of the plurality of stations.

3. A system according to claim 1, wherein the signal processor is configured to measure the depth and mean velocity using an ADCP measurement device and a respective width between adjacent stations by integrated GPS.

4. A system according to claim 1, wherein the signal processor is configured to convert the start and end latitudes and longitudes into start and end Universal Transverse Mercator (UTM) Eastings and Northings to use for determining actual and projected UTM Easting and Northing positions in order to determine the respective distance between each station in relation to the projection or virtual tag line.

5. A system according to claim 1, wherein
the signal processor is configured to provide the output signal as a control signal to take the ADCP measurements at respective GPS positions of the plurality of stations; and
the system comprises an ADCP measurement device configured to receive the control signal, take the ADCP measurements, and provide ADCP measurement signals indicative of the ADCP measurements taken.

6. A system according to claim 1, wherein
the signal processor is configured to provide the output signal as a control signal to take GPS readings for the plurality of stations; and
the system comprises a GPS device configured to receive the control signal, take the GPS readings, and provide GPS reading signals indicative of the GPS readings taken.

7. A system according to claim 1, wherein
the signal processor is configured to provide the output signal as a control signal to take the ADCP measurements at respective GPS positions of the plurality of stations and to take GPS readings for the plurality of stations; and
the system comprises an ADCP/GPS device having an ADCP measurement device configured to receive the control signal, take the ADCP measurements, and provide ADCP measurement signals indicative of the ADCP measurements taken, and also having a GPS device configured to receive the control signal, take the GPS readings, and provide GPS reading signals indicative of the GPS readings taken.

8. A method according to claim 1, wherein the method further comprising providing the output signal as a control signal to take the ADCP measurements at respective GPS positions of the plurality of stations.

9. A method according to claim 1, wherein the method further comprising measuring the depth and mean velocity using an ADCP measurement device and a respective width of each station by integrated GPS.

10. A method according to claim 1, wherein the method further comprising converting in the signal processor the start and end latitudes and longitudes into start and end Universal Transverse Mercator (UTM) Eastings and Northings to use for determining actual and projected UTM Easting and Northing positions in order to determine the respective distance between each station in relation to the projection or virtual tag line.

11. A method according to claim 1, wherein the method further comprising
providing the output signal as a control signal to take the ADCP measurements at respective GPS positions of the plurality of stations; and
using an ADCP measurement device to receive the control signal, take the ADCP measurements, and provide ADCP measurement signals indicative of the ADCP measurements taken.

12. A method according to claim 1, wherein the method further comprising
providing the output signal as a control signal to take GPS readings for the plurality of stations; and
using a GPS device to receive the control signal, take the GPS readings, and provide GPS reading signals indicative of GPS readings taken.

13. A method according to claim 1, wherein the method further comprising
providing the output signal as a control signal to take the ADCP measurements at respective GPS positions of the plurality of stations and to take GPS readings for the plurality of stations; and
using an ADCP/GPS device having an ADCP measurement device to receive the control signal, take the ADCP measurements, and provide ADCP measurement signals indicative of the ADCP measurements taken, and also having a GPS device configured to receive the control signal, take the GPS readings, and provide GPS reading signals indicative of the GPS readings taken.

14. A system according to claim 1, wherein GPS readings are taken using Differential Global Position System (DGPS) or Real Time Kinematic GPS (RTK GPS).

15. A method for determining a measurement of a discharge of a streamflow in open channel conditions using a velocity-area technique, comprising:
receiving in a signal processor a signal representing a projection or virtual tag line having a plurality of stations projected onto the projection or virtual tag line which lies between two Global Position System (GPS) locations and having start and end latitudes and longitudes at a measurement site in a hydrographic operation for a measurement of a discharge of a streamflow in open channel conditions, the projection or virtual tag line having a start GPS position, an end GPS position, a respective actual GPS position of each of the plurality of stations and a respective projected GPS position of each of the plurality of stations, and also receiving a second signal representing a depth and mean velocity of each of the plurality of stations in conjunction with the streamflow obtained from Acoustic Doppler Current Profiler (ADCP) measurements; and
providing with the signal processor an output signal indicative of the measurement of the discharge of the streamflow, based upon the first signal and the second signal received.

16. A method according to claim 15, wherein the method further comprising using Differential Global Position System (DGPS) or Real Time Kinematic GPS (RTK GPS) to take GPS readings.

\* \* \* \* \*